United States Patent [19]
Schneid

[11] Patent Number: 5,560,281
[45] Date of Patent: Oct. 1, 1996

[54] LINEAR SLIDE APPARATUS AND METHOD OF COMBINING TWO OR MORE LINEAR SLIDES

[75] Inventor: Jeffrey R. Schneid, North Olmstead, Ohio

[73] Assignee: Numation, Inc., Westlake, Ohio

[21] Appl. No.: 414,713

[22] Filed: Mar. 31, 1995

[51] Int. Cl.[6] ........................................... F01B 1/02
[52] U.S. Cl. ........................... 92/61; 92/161; 92/165 PR; 901/16
[58] Field of Search ...................... 92/61, 161, 165 PR, 92/166; 901/16

[56] References Cited

U.S. PATENT DOCUMENTS

| | | | |
|---|---|---|---|
| 3,371,583 | 3/1968 | Blatt | 92/61 |
| 3,877,348 | 4/1975 | Sandlin | 92/161 |

OTHER PUBLICATIONS

PHD, Modular Automation, Bulletin MA90, copyright 1989.

*Primary Examiner*—F. Daniel Lopez
*Attorney, Agent, or Firm*—Barnes, Kisselle, Raisch, Choate, Whittemore & Hulbert

[57] ABSTRACT

A fluid actuated linear slide for producing linear movement has a rigid body with a pair of spaced apart parallel bores for slidably receiving a pair of guide rods and a mounting plate fixed to one end of the guide rods. A fluid actuated cylinder is carried by the body between and parallel to the guide rods and has a casing and a rod slidably received in and extending from one end. The rod is connected with the mounting plate for reciprocating the plate and the guide rods with respect to the body. The linear slide is constructed in such a manner that two or more of the slides can be attached in series for producing movement in one or more paths.

16 Claims, 2 Drawing Sheets

LINEAR SLIDE APPARATUS AND METHOD OF COMBINING TWO OR MORE LINEAR SLIDES

FIELD OF THE INVENTION

This invention relates to fluid actuated devices, and more particularly, to a linear slide for producing linear movement and an apparatus and method of combining two or more linear slides.

BACKGROUND OF THE INVENTION

Linear slides are used in robotics applications for actuating and moving devices and tools. Typically, a computerized control system provides regulated fluid pressure to a fluid cylinder to move the cylinder disposed therein. The end of the rod projects from the cylinder and is typically attached to a tool, such as a mechanical gripper, or attached to the tool mounting structure for spacially positioning the tool as desired in robotics operations.

The cylinder rod supports at least a portion of the weight of the tool or its mounting structure in a cantilever fashion, creating a bending moment on the cylinder. This causes excessive stress on the cylinder and on the various seals and bearings within the cylinder. A further result of wear on these components is potential leakage of fluid from within the cylinder, increased static and sliding friction between the rod and the cylinder bearings and seals, and reduced accuracy in positioning the rod axially with respect to the cylinder. The bending moment on the cylinder and rod further causes a reduction in the accuracy of spacially positioning the end of the rod as it moves away from the cylinder.

SUMMARY OF THE INVENTION

The linear slide of this invention has a rigid body with a pair of parallel and spaced apart guide rods each received in a bore passing through the body. A mounting plate is attached to one end of the guide rods and reciprocates in unison with them. The mounting plate is reciprocated with respect to the body, by a fluid actuated cylinder with a casing carried by the body disposed between and generally parallel to the guide rods.

Two or more of the linear slides of this invention can be connected to one another in series to produce a desired movement of an object in one or more paths. The mounting plate of a first linear slide can be attached to the body of a second linear slide such that the second linear slide reciprocates with the first mounting plate. The mounting plate of the second linear slide reciprocates with respect to both the first linear slide and the body of the second linear slide at a right angle to the path of movement of the first mounting plate. The second mounting plate may also be attached to the body of a third linear slide. Movement of the third mounting plate will then reciprocate with respect to all three slides at a right angle to the path of movement of the second mounting plate. Precise control of the axial displacement of each cylinder permits movement of the third mounting plate in one, two or three directions or paths.

Objects, features and advantages of this invention are to provide a fluid actuated linear slide that has accurate linear travel characteristics, reduces lateral deflection of the tool or object carried by the linear slide, reduces lateral deflection of the fluid cylinder rod, reduces the bending moments exerted on the fluid cylinder and rod, reduces wear and tear of the fluid cylinder components, is capable of simple connection to one or more linear slides in series providing movement in one or more desired paths, and is durable, reliable, rugged, of relatively simple design and construction, is relatively lightweight and yet is substantially rigid.

BRIEF DESCRIPTION OF THE DRAWINGS

These and other objects, features and advantages of this invention will be apparent from the following detailed description, appended claims and accompanying drawings in which:

DETAILED DESCRIPTION OF THE PREFERRED EMBODIMENT

Figure 1:
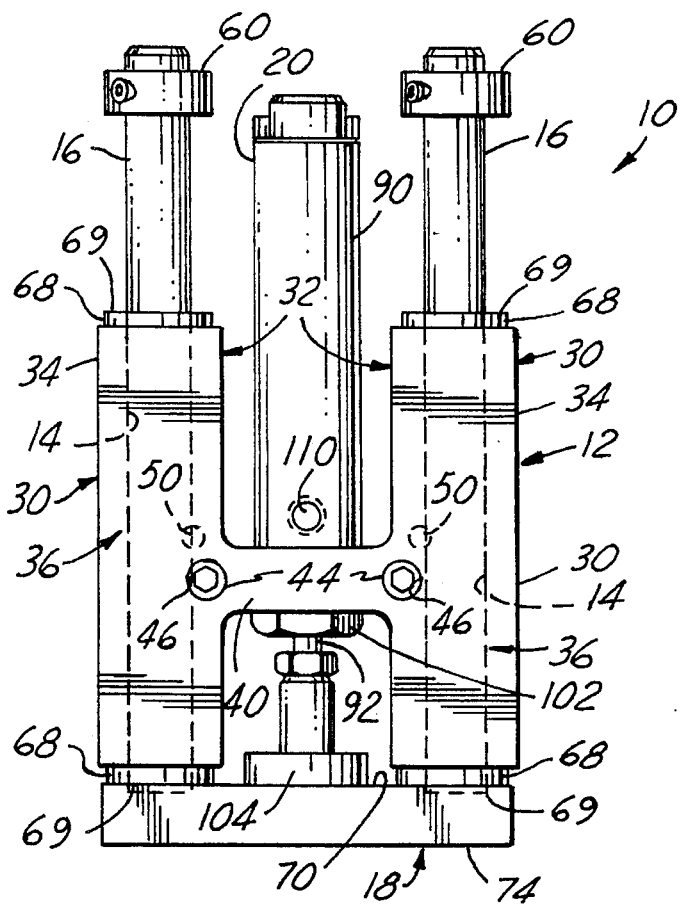
FIG. 1 is a front elevational view of a linear slide constructed in accordance with the present invention.

Referring now in more detail to the drawings, FIG. 1 illustrates a linear slide 10 having a rigid body 12 with a pair of longitudinal bores 14 formed therethrough. A pair of guide rods 16 are slidably received in the bores 14 and are attached at one end to a mounting plate 18. A fluid actuated cylinder 20 is attached to the linear slide 10 for reciprocating the mounting plate 18 and guide rods 16 with respect to the rigid body 12.

The body 12 has a generally "H" shape configuration with a pair of elongate side mounting blocks 30 disposed parallel to and spaced apart from one another. The side blocks 30 are preferably rectangular and positioned such that adjacent surfaces 32 and opposed surfaces 34 are parallel to one another, front surfaces 36 are co-planear to one another, and back surfaces 38 are co-planar to one another and parallel to the front surfaces 36. A cross-member 40 is preferably formed integral with the sides 30 extending therebetween and projecting perpendicularly from the adjacent surface 32 of each of the side blocks 30.

Figure 2:
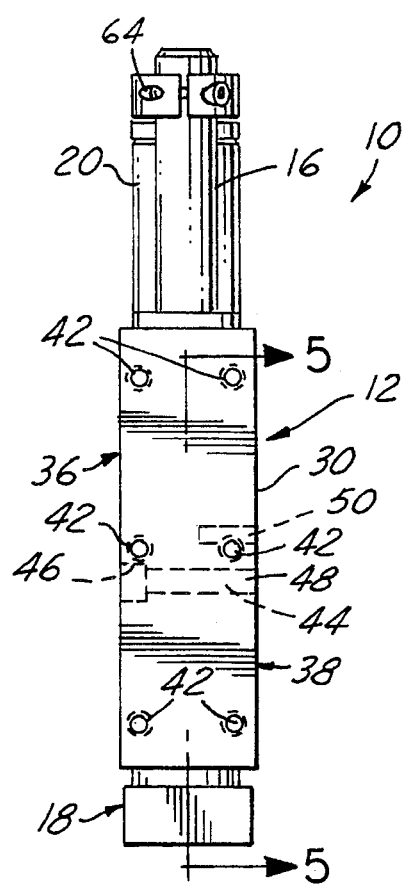
FIG. 2 is a side view of the linear slide shown in FIG. 1.

For mounting the slide 10, a plurality of threaded blind bores 42 are formed in a predetermined pattern in each of the opposed surfaces 34 of the sides 30 as shown in FIG. 2. Preferably, a pair of mounting bores 44 are formed through the body 12 and open to the front and back surfaces 36 and 38, respectively, of the body for mounting the slide 10 to a desired object or structure. The mounting bores 44 each have a coaxial counterbore 46 formed in the front surfaces 36 providing a recess for a cap screw for mounting the slide 10 to an object or structure. As an alternative mounting method, mechanical threads 48 are formed within the mounting bores 44 in the back surfaces 36 of the body 12 for receiving complementary threads, not shown, of fasteners used to mount the slide. If desired, to aid in alignment during mounting of the slide 10, a pair of blind dowel bores 50 may be formed, as shown in FIGS. 1 and 2, each for receiving a dowel pin held by the mounting surface of the object or structure to which the slide is to be attached.

The "H" configuration of the body 12 as shown in FIG. 1 is preferred to provide high strength and minimal deflection while the linear slide 10 is in use and yet reduce the mass of the slide. To minimize the stress concentration in the body 12 around the bores 44, the bores are positioned on the body 12 in an area of minimum deflection of the "H" shape body. Preferably, each bore 44 is formed adjacent one of the longitudinal bores 14 between the center line of one of the guide rods 16 and the cylinder 20 and on or near the centerline of the cross-member 40. A substantial radius is desirable where the cross-member 40 and the sides 30 join to better distribute the high stress concentrations at those points. Preferably, the body 12 is formed of a hard coat anodized aluminum material such as 6061–T6511 aluminum for providing a strong and lightweight body having a surface resistant to nicks, scratches and gouges.

The bores 14 in the body 12 are preferably formed in and coaxially with each of the side blocks 30. The guide rods 16 are received in the bores 14 and are cut to a sufficient length for providing the desired maximum linear travel for the slide 10. The guide rods 16 are preferably formed of a high carbon steel having a case hardened and ground and polished outer surface providing a scratch and nick resistant surface having a low sliding coefficient of friction. Alternatively, the guide rods could be formed of a stainless steel where the linear slide would be used in a corrosive environment. A threaded blind bore 52 is formed in one end of each rod for attachment to the mounting plate 18.

To limit the travel of the mounting plate 18, an adjustable stop 60 is received on the other end of each of the guide rods 16. Preferably, each stop 60 is a split ring 62 having a tapped bore 64 formed therein for receiving a threaded adjustment screw 66. As the adjustment screw 66 is tightened, the split ring 62 contracts clamping around the guide rod 16 to hold it in place. The position of the stop on the guide rod can be adjusted by backing out the adjustment screw to expand the split ring and release the clamping force and then sliding the stop on the guide rod to its desired position.

A bearing assembly 68 is received within and adjacent each end of the bores 14 for journalling the guide rods 16 within the bores. The bearings may include a wiper seal feature for keeping the guide rods free of contamination when the linear slide 10 is in use. If desired, the bearings may extend outwardly from the ends of the bores 14 for providing a bumper surface 69 to reduce the shock caused by contact of the stops 60 and the mounting plate 18 with the body 12 as the slide reciprocates during operation.

Figure 3:
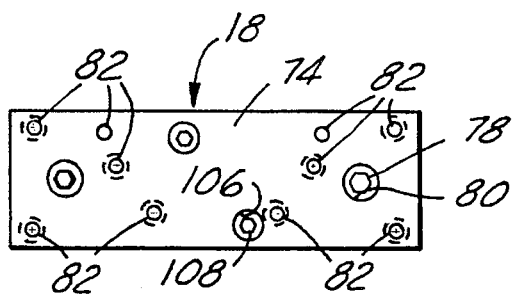
FIG. 3 is an end view showing the mounting plate tool mounting surface of the linear slide shown in FIG. 1.
Figure 4:
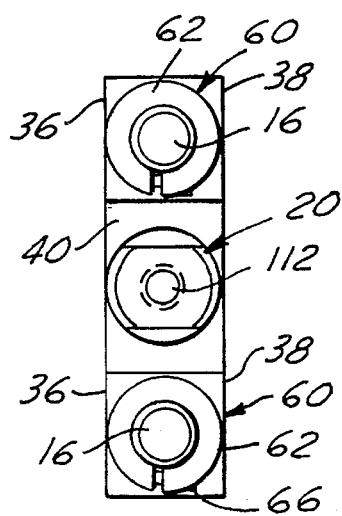
FIG. 4 is an end view showing the guide rods and air cylinder of the linear slide shown in FIG. 1.
Figure 5:
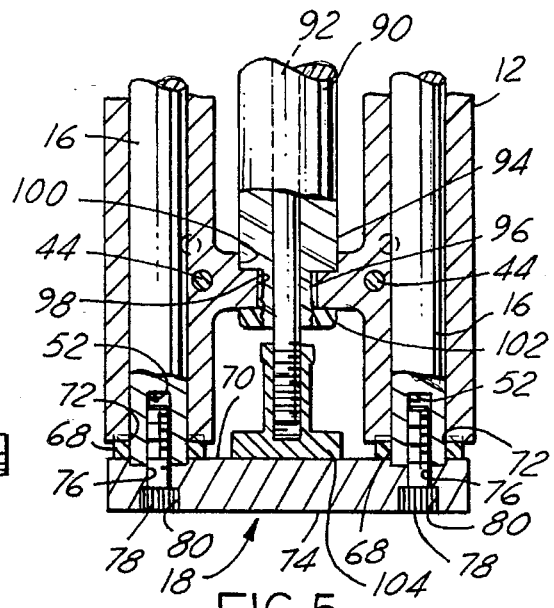
FIG. 5 is a sectional view of the mounting plate taken along line 5—5 of FIG. 2.

The mounting plate 18, as shown in FIGS. 3 and 5, is preferably fabricated from a rectangular slab having a length generally equivalent to the width of the "H" shape body and a width generally equivalent to the depth of the side blocks 30. The plate 18 has a cylinder rod mounting surface 70 adjacent the body 12 for connection with the cylinder rod and guide rods 16. A pair of counterbores 72 are formed in the surface 70 for receiving one end of the guide rods therein. Added lateral rigidity is achieved by recessing the guide rods in the mounting plate. A tool mounting surface 74 is on the opposite side of the mounting plate for receiving a tool thereon or attachment to another tool slide 10. A pair of smaller diameter bores 76 are formed in the tool mounting surface coaxial with counterbores 72 for receiving a pair of cap screws 78 therethrough which screw into the blind bores 52 of the guide rods 16 to secure the guide rods to the mounting plate. A pair of counterbores 80 are formed in the bores 76 providing a recess of sufficient depth such that the screws 78 are at least flush with the tool mounting surface.

For providing multi-purpose mounting configurations, a predetermined pattern of mounting plate bores 82 is formed in the tool mounting surface 74 of the plate 18. Some of the bores 82 may simply be blind reamed dowel bores for receiving a dowel pin therein as an alignment aid. Some of the bores 82 may be threaded blind bores for receiving a threaded fastener therein. Some of the bores 82 may also have a recessed counterbore at one end and threads at the other end providing a bore which may receive a cap screw therethrough or the threaded end of a cap screw. The bore pattern is selected as a standardized formation such that the mounting plate can be attached to either a tool, another linear slide or an adapter plate for mounting either, each having holes aligning with at least a portion of the bores 82.

The fluid cylinder 20, preferably of the pneumatic type, is mounted between the side blocks 30 to the cross-member 40 parallel to the guide rods 16. The cylinder 20 has an elongate cylindrical casing 90 having a reciprocable rod 92 received in and projecting from one end 94 of the casing. A smaller diameter threaded neck 96 projects from the one end 94 of the casing for mounting the cylinder to the cross-member 40. If desired, the cylinder may be of the type providing an electronic indication of cylinder rod linear displacement for applications requiring precise control and measurement.

For mounting the cylinder 20 to the cross-member 40, a bore 98 is formed through the cross-member adjacent the mounting plate end of the slide and parallel to the guide rods 16. A coaxial counterbore 100 is formed on the opposite side of the cross-member. The one end 94 of the cylinder casing 90 is received in the counterbore 100 with the neck 96 received through the bore 98. A nut 102 is threaded onto the neck 96 to retain the cylinder 20 to the cross-member 40.

A floating coupling 104 is attached to the end of the rod 92 and connects the rod to the mounting plate 18. A pair of bores (not shown) in the coupling correspond to a pair of bores 106 in the mounting plate for receiving a cap screw 108 therethrough for connecting the coupling to the plate. Preferably, the coupling 104 is of a type allowing free rotation of the rod 92 and permitting some lateral movement of the rod reducing or eliminating bending stress on the rod which in turn reduces wear and tear on the cylinder components.

For operating a linear slide 10, the cylinder 20 has two connection ports 110 and 112, one disposed at each end of the casing 90 for receiving fittings connected to air lines. To produce linear travel of the mounting plate 18, the body 12 is mounted to a fixed surface and compressed air is supplied to and regulated between the ports 110 and 112. The mounting plate will reciprocate along the cylinder axis in unison with the cylinder rod 92 relative to the body 12.

Figure 6:
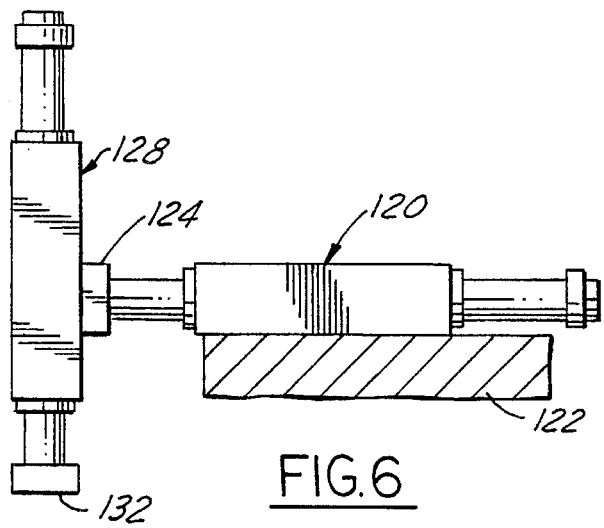
FIG. 6 is a side view of two linear slides connected in series according to the present invention.
Figure 7:
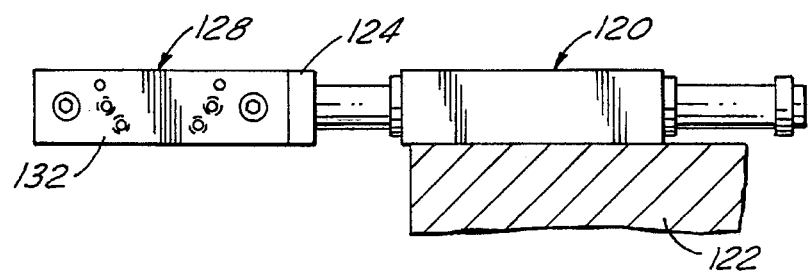
FIG. 7 is a side view of two linear slides showing an alternative method of mounting and attaching two linear slides in series.
Figure 8:
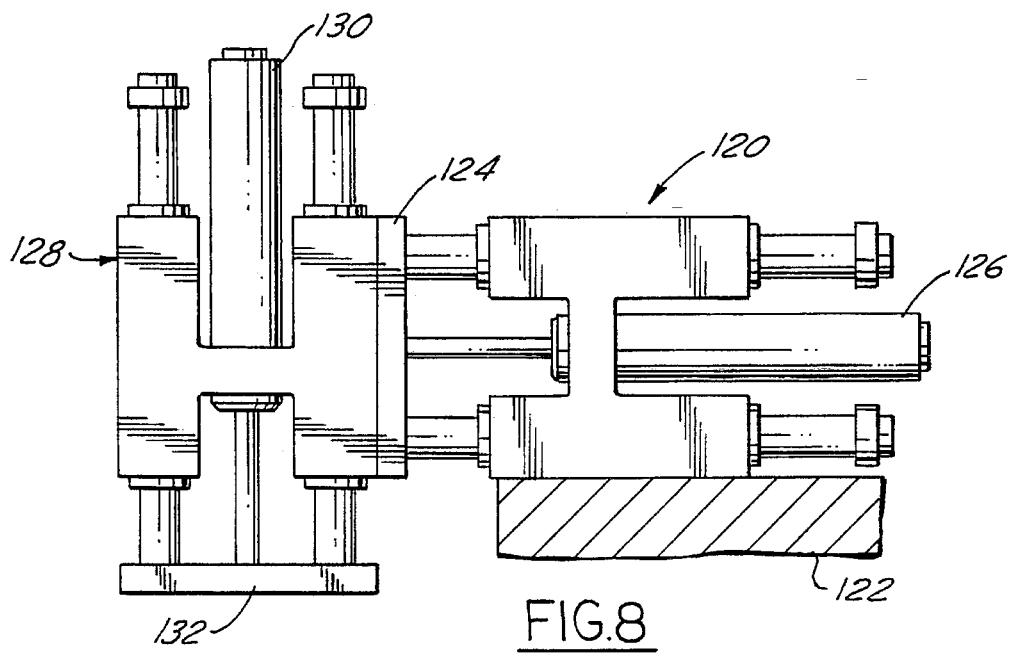
FIG. 8 is a side view showing another alternative method of mounting and attaching two linear slides in series.

As shown in FIGS. 6–8, two linear slides may be mounted in series providing movement along more than one axis. For convenience, the horizontal axis of FIGS. 6–8 will be termed the X-axis, the vertical axis termed the Y-axis, and the axis perpendicular to them and the page termed the Z-axis. A first slide 120, shown in FIG. 6, is mounted to a fixed surface 122 and has a first mounting plate 124 and a first cylinder 126. The plate 124 is attached to the front of a second linear slide 128 which has a second cylinder 130 and a second mounting plate 132. The first mounting plate 124 moves along the X-axis controlled by air supplied to the first cylinder 126. The second mounting plate 132 may move along the Y-axis if controlled only by air supplied to the second cylinder 130.

The second mounting plate may also move in the X-Y plane if controlled by simultaneous movement of the first plate 124 and air supplied to the second cylinder.

FIG. 7 shows the first plate attached to the side of the body of the second slide 128. In this orientation, the second plate 132 may move along the Z-axis if controlled by only air supplied to the second cylinder. The second plate may move in the X-Z plane if controlled by simultaneous movement of the first plate 124 and air supplied to the second cylinder.

FIG. 8 shows an alternative X-Y mounting orientation where the first slide 120 is mounted on its side to the fixed surface 122 and the first plate 124 is attached to the side of the second slide 128. As is easily understood, the hole patterns in the various surfaces of the linear slides may be formed as desired providing standardized alignment for any number of mounting orientations. The apparatus shown in FIGS. 6–8 are merely examples and are not intended to represent the only possible mounting orientations.

One aspect of the invention is to provide linear slides having standardized mounting holes and bores which correspond to similar standardized formations in other slides, various tools, and fixtures. This provides easy, flexible and adaptable assembly and usage of linear slides according to the invention. The standardized mounting system and method eliminates the need for additional adapters and transisition plates and any additional fasteners necessary for mounting such adapter plates.

As will also be easily understood, a third linear slide could be attached to the second mounting plate 132 of the apparatus shown in FIGS. 6–8. Movement of the third mounting plate may be manipulated in the X, Y or Z-axis or in any combination thereof by controlling the air supplied to all three cylinders. Therefore, by using one, two or three slides, movement of a tool or the like can be controlled along one, two or three orthoganal axes respectively.

What is claimed is:

1. A fluid actuated linear slide for producing linear movement comprising, a rigid body having a generally "H" shape configuration with a pair of spaced apart elongate sides and a transverse cross-member between the sides and disposed adjacent the longitudinal mid point of the elongate sides, and a pair of laterally spaced apart and parallel bores passing axially through the elongate sides, a pair of guide rods each slidably received in one of said bores, a mounting plate fixed to said guide rods adjacent one end thereof for movement in unison therewith, and a fluid actuated cylinder having a cylinder rod received therein and extending from one end thereof, said cylinder being received between and extending generally parallel to said guide rods and being carried by said body, and said cylinder rod being connected with said mounting plate for reciprocating said plate with respect to said body.

2. The linear slide according to claim 1 wherein said cylinder is carried by said cross-member between and parallel to said guide rods.

3. The linear slide according to claim 1 wherein said cylinder rod is connected with said plate by a floating coupling.

4. The linear slide according to claim 1 wherein said elongate sides and said cross-member are of an essentially rectangular configuration forming on said rigid body an essentially flat front surface, back surface and pair of side surfaces.

5. The linear slide according to claim 4 wherein said rigid body further comprises a predetermined pattern of bores formed therein on said front surface and said back surface for mounting said linear slide in a desired manner, and said front and back surface have the same predetermined pattern of bores.

6. The linear slide according to claim 5 wherein said body further comprises a predetermined pattern of bores formed therein on said pair of side surfaces for mounting said linear slide in a desired manner, and said front, back and side surfaces having the same predetermilned pattern of bores.

7. The linear slide according to claim 1 wherein said guide rods are essentially cylindrical.

8. The linear slide according to claim 1 wherein each of said guide rods has a stop releasably attached thereto adjacent the other ends thereof.

9. The linear slide according to claim 8 wherein each of said stops comprises a split ring slid over said other ends of said guide rods and clamped in a predetermined position thereon to limit the linear travel of said plate relative to said body.

10. The linear slide according to claim 1 wherein a bearing is disposed adjacent each end of each of said bores for journalling said guide rods in said bores for reciprocation relative to said rigid body.

11. The linear slide according to claim 10 wherein said mounting plate further comprises a predetermined pattern of bores formed therein for attaching said mounting plate to a desired object.

12. The linear slide according to claim 11 wherein said body has front, back and side surfaces, and a predetermined pattern of bores in said front, back and side surfaces which corresponds with the pattern of bores in said mounting plate so that another of said linear slides can be mounted to said mounting plate.

13. A fluid actuated linear slide for producing linear movement comprising, a rigid body having an "H" shape configuration with a pair of laterally spaced apart and parallel elongate side blocks each having a bore passing axially therethrough and a cross-member disposed between and connected essentially perpendicular to and adjacent the longitudinal mid-point of said side blocks, a pair of guide rods each slidably received in one of said bores, a mounting plate fixed to said guide rods adjacent one end thereof for movement in unison therewith, and a fluid actuated cylinder carried by said cross-member betwen and parallel to said guide rod and having a cylinder rod received therein and extending from one end thereof, said cylinder rod being connected with said mounting plate for reciprocating said plate with respect to said body.

14. A first fluid actuated linear slide for producing linear movement comprising, a first rigid body having a generally H-shaped configuration with a first pair of laterally spaced apart and parallel bores therethrough, a first pair of guide rods each slidably received in one of said first bores, a first mounting plate fixed to said first guide rods adjacent one end thereof for movement in unison therewith, a first fluid actuated cylinder having a first cylinder rod received therein and extending from one end thereof, being received between and extending generally parallel to said first guide rods and being carried by said first body, and said first cylinder rod being connected with said first mounting plate for reciprocating said first plate with respect to said body, a second fluid actuated linear slide comprising, a second rigid body having a generally H-shaped configuration with a second pair of laterally spaced apart and parallel bores therethrough, a second pair of guide rods each slidably received in one of said second bores, a second mounting plate fixed to said second guide rods adjacent one end thereof for movement in unison therewith, a second fluid actuated cylinder having a second cylinder rod received therein and extending from one end thereof, said second cylinder being received between and extending generally parallel to said second guide rods and being carried by said second body, and said second cylinder rod being connected with said sescond mounting plate for reciprocating said second plate with respect to said second body, and said first mounting plate being connected to said second body such that said second body can be reciprocated with respect to said first body.

15. A method of combining two or more linear slides for producing movement in two or more paths comprising the steps of:

a. providing a first fluid actuated linear slide for producing linear movement comprising, a first rigid body having a generally H shape configuration with a pair of laterally spaced apart elongate side blocks and an interconnecting cross-member disposed adjacent the longitudinal midpoint of the side blocks and a first pair of laterally spaced apart and parallel bores through the side blocks, a first pair of guide rods each slidably received in one of said first bores, a first mounting plate fixed to said first guide rods adjacent one end thereof for movement in unison therewith, a first fluid actuated cylinder having a first cylinder rod received in and extending from one end thereof, said first cylinder being received between and extending generally parallel to said first guide rods and being carried by said first body, and said first cylinder rod being connected with said first mounting plate for reciprocating said first plate with respect to said body, b. providing at least a second fluid actuated linear slide comprising, a second rigid body having a generally H-shape configuration with a pair of laterally spaced apart elongate side blocks and an interconnecting cross-member disposed adjacent the longitudinal mid point of the side blocks and a second pair of laterally spaced apart and parallel bores through the side blocks, a second pair of guide rods each slidably received in one of said second bores, a second mounting plate fixed to said second guide rods adjacent one end thereof for movement in unison therewith, a second fluid actuated cylidner having a second cylinder rod received therein and extending from one end thereof, said second cylinder being received between and extending generally parallel to said second guide rods and being carried by said second body, and said second cylinder rod being connected with said second mounting plate for reciprocating said second plate with respect to said second body, c. attaching said first and second linear slides to one another such that one of said first or second bodies can be reciprocated with respect to the other of said first or second bodies, and d. actuating said first and second fluid actuated cylinders.

16. The method according to claim 15 which also comprises the step of forming a predetermined pattern of bores in said first and second bodies and a predetermined pattern of bores in said first and second moutning plates which is performed prior to step c., such that said pattern formed in said plates coresponds with said pattern in said bodies so that one of said first or second bodies can be directly attached to the other of said first or second mounting plates.

* * * * *